United States Patent [19]
Grunbok et al.

[11] Patent Number: 5,333,291
[45] Date of Patent: Jul. 26, 1994

[54] STRIDE ENHANCER FOR HIGH SPEED MEMORY ACCESSES WITH LINE FETCHING MODE AND NORMAL MODE EMPLOYING BOUNDARY CROSSING DETERMINATION

[75] Inventors: Warren W. Grunbok, Poughkeepsie; Donald W. Price, Lake Katrine; De Tran, Woodstock, all of N.Y.

[73] Assignee: International Business Machines Corporation, Armonk, N.Y.

[21] Appl. No.: 717,772

[22] Filed: Jun. 14, 1991

[51] Int. Cl.⁵ .................... G06F 12/02; G06F 12/08
[52] U.S. Cl. .................. 395/425; 364/DIG. 1; 364/243.4; 364/244.3; 364/262.4; 395/400
[58] Field of Search ... 364/200 MS File, 900 MS File; 395/425, 400

[56] References Cited

U.S. PATENT DOCUMENTS

| | | | |
|---|---|---|---|
| 4,110,822 | 8/1978 | Porter et al. ................ | 395/375 |
| 4,873,630 | 10/1989 | Rusterholz et al. ........... | 395/800 |
| 5,179,674 | 1/1993 | Williams et al. ............. | 395/400 |
| 5,197,002 | 3/1993 | Spencer ...................... | 364/406 |
| 5,202,972 | 4/1993 | Gusefski et al. ............. | 395/425 |

FOREIGN PATENT DOCUMENTS 0282248 9/1988 European Pat. Off. .
0288636 11/1988 European Pat. Off. .
89/06397 7/1989 PCT Int'l Appl. .

*Primary Examiner*—Joseph L. Dixon
*Assistant Examiner*—Matthew M. Kim
*Attorney, Agent, or Firm*—Floyd A. Gonzales; Robert L. Troike

[57] ABSTRACT

A stride enhancer provides high memory bandwidth on strides greater than one and minimizes requests to memory. The basic memory module (BSM) design uses line fetches as the basic cache complex fetch mechanism and allows operation of the BSM to be stride independent. In the preferred implementation, the BSM has two fetch modes; a normal mode and a line fetch mode. In the normal mode, a quadword (QW) is fetched as in the conventional design. In the line fetch mode, all double words (DWs) within the referenced line are returned to the storage control element (SCE) at two DWs per cycle for strides one through eight (twice the conventional bandwidth) or at least one DW per cycle for all other strides (equal to the conventional bandwidth). This is accomplished with two DW busses rather than a single QW bus and by interleaving DW storage locations within the BSM. In line fetch mode for strides one through eight, DWs are read out according to the stride on the two DW busses.

9 Claims, 11 Drawing Sheets

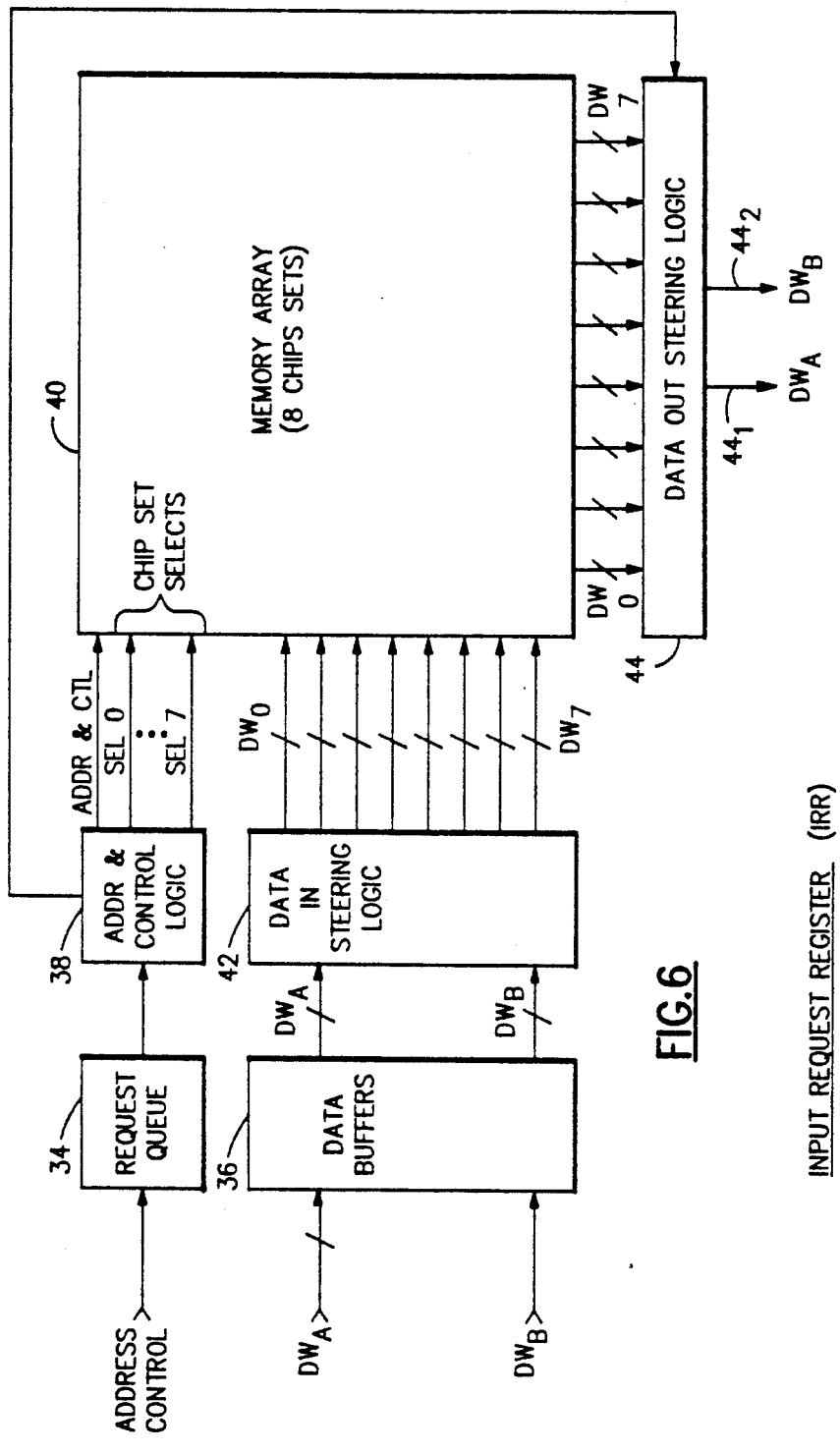

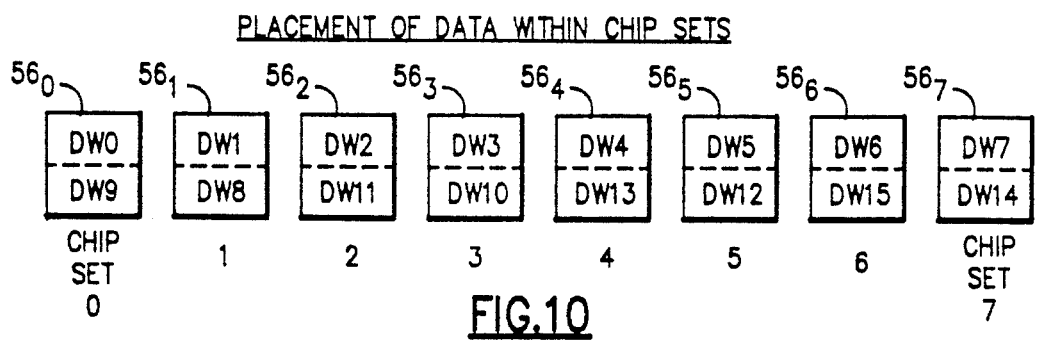
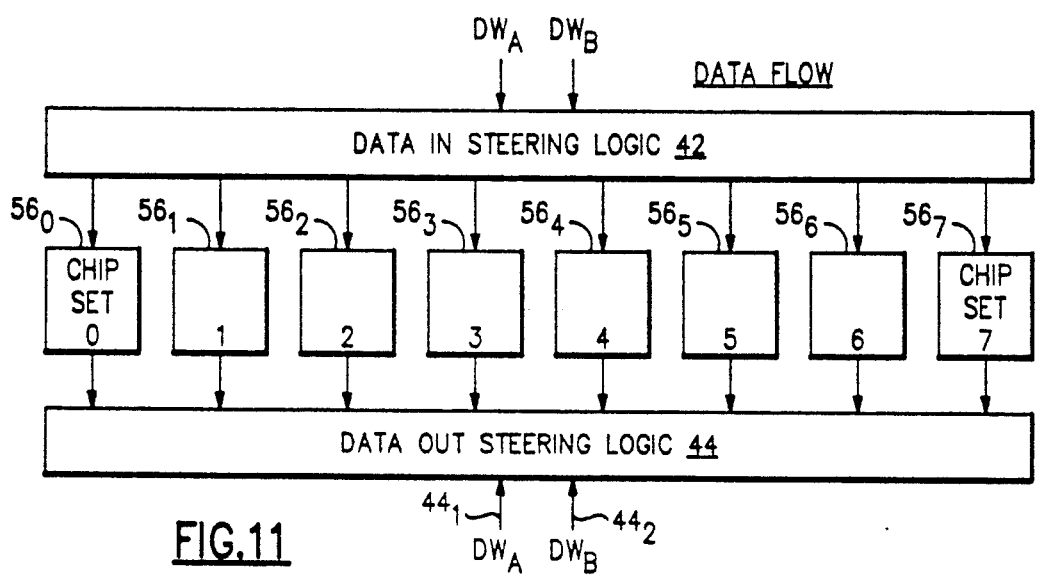
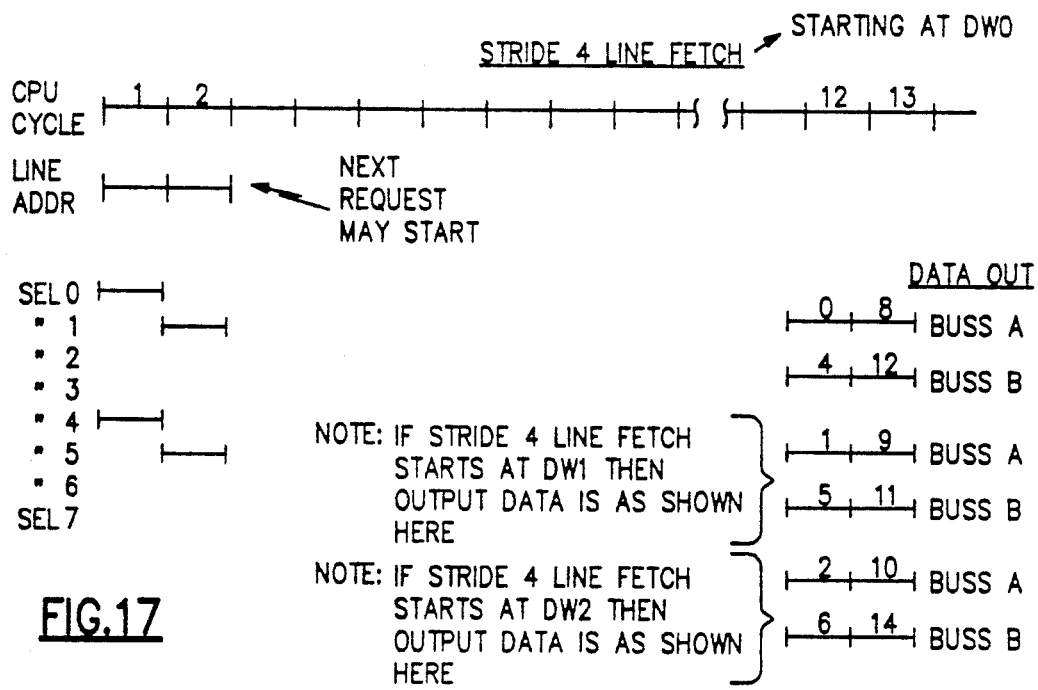

STRIDE ENHANCER FOR HIGH SPEED MEMORY ACCESSES WITH LINE FETCHING MODE AND NORMAL MODE EMPLOYING BOUNDARY CROSSING DETERMINATION

BACKGROUND OF THE INVENTION

1. Field of the Invention

The present invention generally relates to high performance computer memory organization and operation and, more particularly, to a new basic storage module design having a high storage bandwidth on strides greater than one and minimizes requests to the memory.

2. Description of the Prior Art

Computer system performance is extremely dependent on the average time to access storage. For several generations of machines, cache memory systems have been used to decrease the average memory latency to an acceptable level. In cache systems, the average memory latency can be described as the cache access time multiplied by the percentage of accesses found in the cache (hits) plus the percentage of accesses not found in the cache (misses) times the "out-of-cache" access time. Due to the large discrepancy between the access times for a hit and for a miss, which is sometimes more than a factor of ten, even a small percentage of accesses being misses can result in the effects of the "out-of-cache" access time dominating the average memory latency.

In an effort to increase the hit percentage, many different approaches have been described which attempt to prefetch cache lines on the basis of previous hit/miss information, accessing patterns, and so forth. Since the cache is often completely transparent to the user, hardware must make prefetching predictions with no knowledge of the type of program, whether the current instructions were generated for code in a loop (which would have a bearing on whether a particular access pattern was likely to be repeated), or whether future instructions would reference data in a given cache line. As the code is being executed, it is difficult for hardware to reconstruct loops, especially iteration counts, until the loop is finished.

Still, attempts to accurately prefetch data can be profitable. Through trace driven simulation, A. J. Smith reported in "Sequential program prefetching in memory hierarchies", IEEE Computer, 11, 12 (December 1978), pp. 7-21, finding that "Prefetching all memory references in very fast computers can increase effective CPU speed by 10 to 25 percent." Smith, however, was only concerned with prefetching the line with the "next sequential (virtual) address". J. D. Gindele in "Buffer block prefetching method", IBM Technical Disclosure Bulletin, 20, 2 (July 1977), pp. 696-697, states "With prefetching, equivalent hit ratios can be attained with a cache buffer of only ½ to ¼ capacity of a cache buffer without prefetching." Gindele's method worked well in cases where the next sequential cache line was the correct line to prefetch.

When successive elements are quite distant (in linear address space), sequential address prefetch not only pollutes the cache with data the processor may never reference, the line which the processor will require is never prefetched. Almost every prefetch scheme assumes that the correct line to prefetch is simply the next sequential line. One exception is reported by J. H. Pomerene et al. in "Displacement lookahead buffer", IBM Technical Disclosure Bulletin, 22, 11 (April 1980), p. 5182.

In many scientific/engineering applications, most of the time is spent in loops. Much of the loop time is often spent in nested loops, and a lot of nested loops make use of multi-dimensional arrays. For the internal storage representation of multi-dimensional arrays, a column-wise mapping is assumed as is used in FORTRAN. In the case that the inner loop steps down columns, "stride-1" accesses (adjacent elements in storage) result. Most cache designs perform well in this case since when one element is fetched into the cache, a line (or group of contiguous elements) are fetched. A miss might occur for the first access to the line, but hits are assumed for the next several accesses.

When the inner loop moves across rows, stride-N accessing occurs, where the distance between consecutively referenced addresses is N words. Generally, N is larger than the number of elements fetched in the line; therefore, unless the data remains in the cache long enough to be used on the next row (a future iteration of an outer loop), misses will probably occur for each request, degrading performance. Some numerical solution methods used in scientific and engineering programs, such as Alternating Difference Implicit, sweep the data in several directions. Without careful coding, large arrays will "flush" the cache and no reuse will occur. Each access generates a miss which in turn increases the amount of time the processor sits idle waiting for data. The amount of degradation can be diminished if the cache lines can be prefetched so that the line fetched can be overlapped with other calculations in the loop.

Stride two is particularly important (after stride one) due to complex number representation using two contiguous DWs (real and imaginary components) in scientific applications. However, while the "stride" is important for scientific applications, this invention is aimed at solving a problem which is characterized by storage referencing patterns rather than computational attributes. For example, other potential candidates which might benefit from this invention include portions of applications in the areas of database and payroll processing which access a given field in each of a set of fixed-length records. These would result in accesses with a stride which is the same as the record length.

High performance computer systems frequently involve the use of multiple central processing units (CPUs), each operating independently, but occasionally communicating with one another or with basic storage modules (BSMs) which comprise the main memory when data needs to be exchanged. A storage control element (SCE) which operates a switching system, such as a crossbar switch, is used to interconnect CPUs and BSMs. This type of system is illustrated in FIG. 1 which shows a large number of CPUs $10_0$ to $10_M$, each operating independently and in parallel with each other. Each of the CPUs $10_0$ to $10_M$ occasionally requires access to one of several BSMs $12_0$ to $12_N$. Note that the number of BSMs is not necessarily the same as the number of CPUs (i.e., $N \neq M$). Typically, $N > M$. Each CPU has an input/output (I/O) path 14, and each memory device has an I/O path 16. The paths 14 and 16 can be buses and may be duplicated to provide full-duplex communication. Selective connection of an I/O path 14 to an I/O path 16 is performed by the SCE and switch 18.

In high performance computer systems of the type shown in FIG. 1, each CPU includes a cache complex (CP) which communicates to the BSMs via the SCE. A typical CPU is shown in FIG. 2 and comprises both scalar execution elements (SXE) 20 and a vector execution element (VXE) 22. The SXE 20 and the VXE 22 are both controlled by the instruction decode element 24. Both make memory requests to the SCE 18 (shown in FIG. 1). In the case of the SXE 20, these requests are made via the data cache 26 and the data steering logic 28; however, in the case of the VXE 22, the requests bypass the cache and are routed to the memory directly by the steering logic 28. Although the VXE 22 can process two DW fetches per cycle, it can only generate one address per cycle. Therefore, unless the memory subsystem can fetch two DWs per cycle based on the original address plus the stride value, the VXE will operate at only 50% efficiency.

For such a high performance computer system, what is needed is a memory system that solves two major requirements:

(a) The memory system is required to do data cache line fetches as a single operation. The CPU SXE 20 execute through the data cache 26 (store through) with a fixed line size 27 of 128 bytes (i.e., sixteen double words (DWs) where a DW is 64 bits). In addition, since the cache 26 is store through, the memory system must also accommodate DW stores, but not line stores.

(b) The VXE 22 does not use the data cache 26 but can process two DWs per cycle (at any "stride") as one operation. The ideal memory design, then, would be one that could do cache line fetches with only one fetch request at a quadword (QW), or 128 bits, per cycle data rate, could do fetches or stores of two stride N DWs per request, and finally could do random DW scalar stores at one per; cycle per BSM.

Since on vector operations requests of multiple DWs of data are made and these DWs are contiguous for stride one operations, the requests impose a high storage bandwidth requirement. To satisfy this requirement, a design using multiple BSMs, each with a wide data interface to and from the SCE, could be used. This assumes that quadword (QW) zero is on $BSM_0$, $QW_1$ is on $BSM_1$, etc., such that the first set of QWs is spread evenly across all the BSMs. Similarly, second and remaining sets of contiguous QWs are likewise spread equally across all the BSMs, as generally illustrated in FIG. 3.

The rational for this type of design is to provide a very high storage bandwidth for stride one operations. With this design, every CP storage fetch request, for a QW, is on a QW boundary and, therefore, for stride N requests ($N \neq 1$), the bandwidth is half that of stride one.

While the design shown in FIG. 3 can do stride one vector fetches at two DWs per request (the ideal case), it can do requests other than stride one at only one DW per request. In addition, cache line fetches can not be done as a single BSM request but have to be broken up into eight requests all going to separate BSMs. The resulting additional complexity in the cache 26 (to generate the eight requests and resequence the returning data that is potentially out of sequential order) presents an unacceptable design and performance hit for scalar requests.

SUMMARY OF THE INVENTION

It is therefore an object of the present invention to provide a new BSM design wherein the storage bandwidth for stride N operations is the same as the bandwidth for stride one operations.

It is another object of the invention to provides a BSM design which provide high memory bandwidth on strides greater than one and minimizes requests to the memory.

The memory design according to the present invention improves on the design shown in FIG. 3 by adopting a BSM design that does cache line fetches from a single request, can do stride one fetches and stores at optimum rates, and can do stride $\leq 8$ also at two DWs per cycle while still doing stride n as well as in the conventional approach. This is allowed by doing two kinds of operations:

(a) Fetches for all DW elements within a single "line" (cache line fetches and stride one through stride eight vector fetches). Note that in this specific application, eight is half the line size.

(b) Fetches and stores of one DW per request for vector stride N ($N > 8$) and scalar DW stores or for one or two DWs per request for vector stride N ($N \leq 8$).

The type (a) requests are multi-cycle data bus operations, while the type (b) requests involve only one data bus cycle.

More specifically, there is provided a BSM design which uses line fetches (sixteen DWs) as the basic CP fetch mechanism and allows operation of the BSM to be stride independent. The invention is a stride enhancer that provides high memory bandwidth on strides greater than one and minimizes requests to memory. The BSM design uses line fetches as the basic cache complex fetch mechanism and allows operation of the BSM to be stride independent. In the preferred embodiment, the BSM has two fetch modes; a normal mode and a line-fetch mode. In the normal mode, QW is fetched as in the conventional design. In the line fetch mode, all DWs within the referenced line are returned to the SCE at two DWs per cycle for strides one through eight (twice the conventional bandwidth) or at least one DW per cycle for all other strides (equal to the conventional bandwidth). This is accomplished with two DW busses rather than a single QW bus and by interleaving DW storage locations within the BSM. In line fetch mode for strides one through eight, DWs are read out according to the stride on the two DW busses.

BRIEF DESCRIPTION OF THE DRAWINGS

The foregoing and other objects, aspects and advantages will be better understood from the following detailed description of a preferred embodiment of the invention with reference to the drawings, in which:

FIG. 6 is a block diagram showing in more detail the design of a single BSM;

FIG. 7 is a diagram of the data structure of the next request from the request queue of FIG. 6;

FIG. 10 is a block diagram illustrating the placement of data within the chip sets of the BSM;

FIG. 11 is a block diagram illustrating the data flow for the BSM shown in FIG. 6;

FIG. 17 is a timing diagram showing the operation of the BSM according to the invention for a stride four line fetch.

DETAILED DESCRIPTION OF A PREFERRED EMBODIMENT OF THE INVENTION

Figure 1:
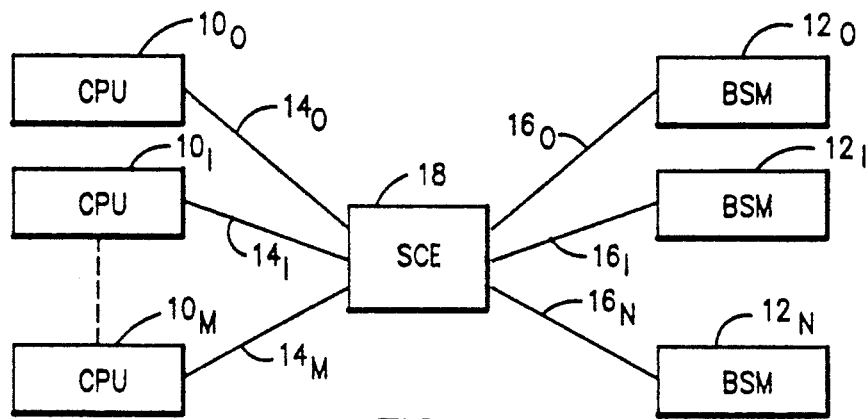
FIG. 1 is a high level block diagram showing a typical multi-processor computer system of the type in which the invention may be implemented.
Figure 3:
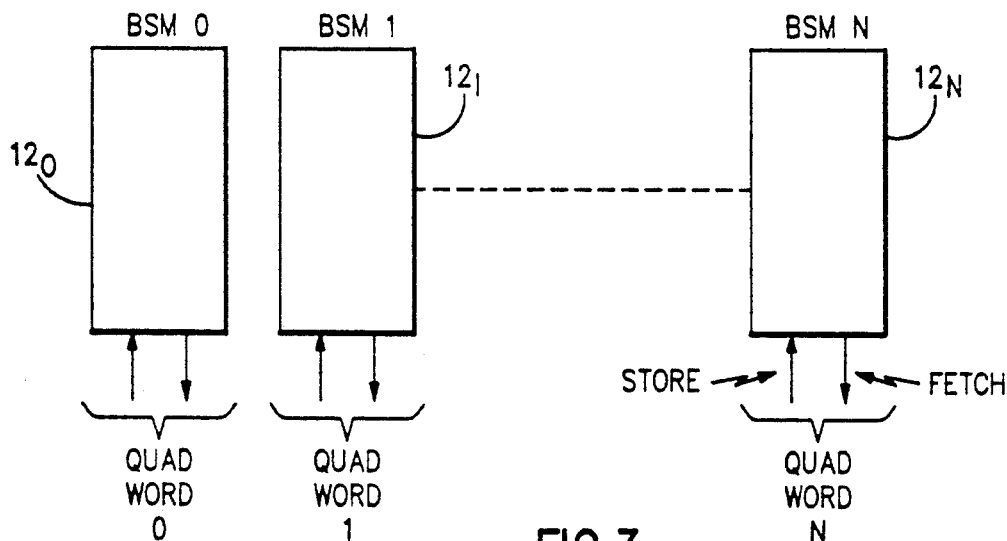
FIG. 3 is a block diagram showing a memory system composed of a plurality of BSMs, each storing and fetching a quad word.
Figure 2:
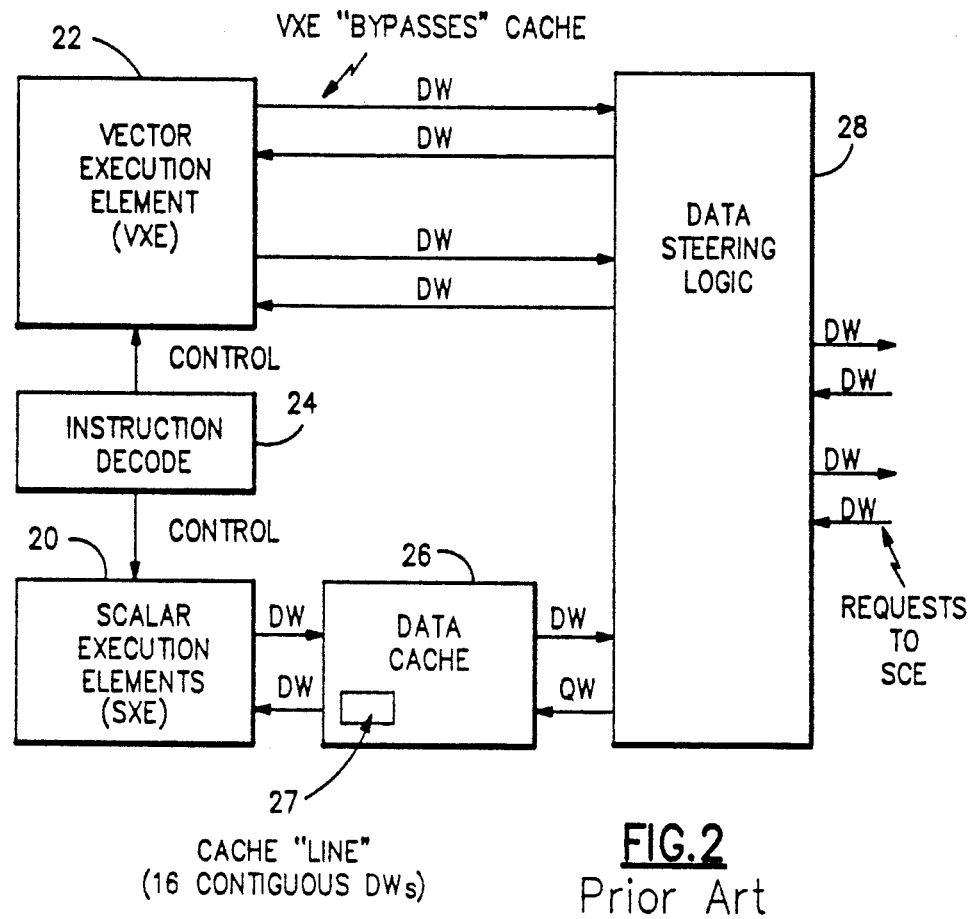
FIG. 2 is a block diagram showing the organization of a high performance CPU of the type used in the multi-processor computer system shown in FIG. 1.
Figure 4:
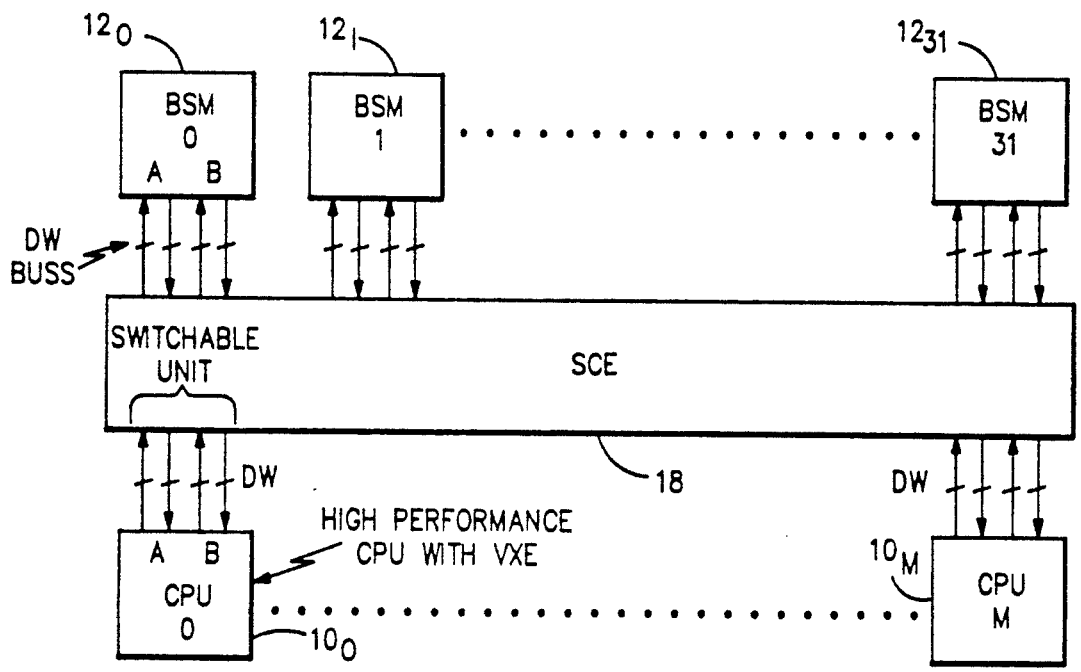
FIG. 4 is a block diagram showing the overall system design according to the invention in which BSMs have two fetch modes.

Referring now to the drawings, and more particularly to FIG. 4, there is shown a multi-processor system of the type shown in FIG. 1 comprising a plurality of CPUs $10_0$ to $10_M$ connected to a plurality of BSMs $12_0$ to $12_{31}$ via an SCE 18. According to a specific feature of the invention, each BSM and each CPU are provided with two DW buses rather than a single QW bus. In the example illustrated, the 32 BSMs are each capable of storing 128 MBytes for a total main memory capacity of 4 giga bytes (GBytes). Each CPU is assumed, for purposes of this example, to have one scalar unit with a data cache and one vector unit without a cache, as illustrated in FIG. 2.

Figure 5:
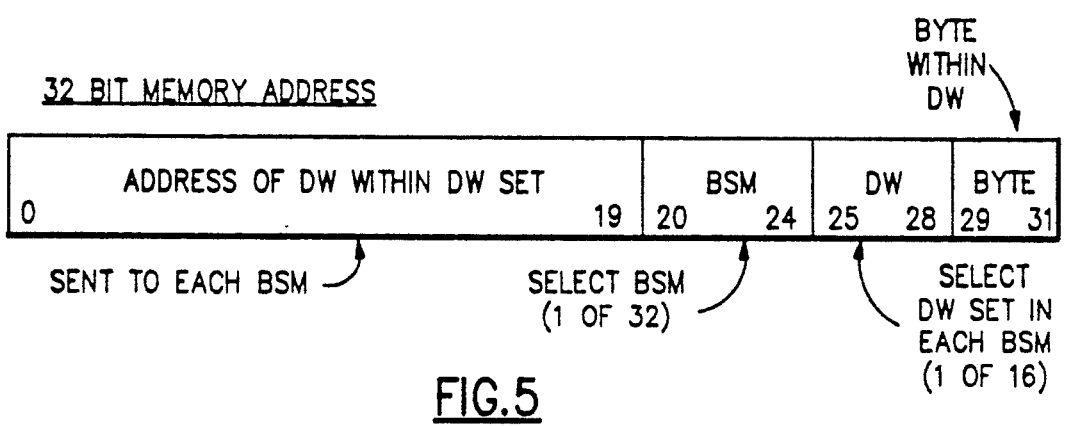
FIG. 5 is a diagram showing the format of the cache request for a 32-bit memory address.

FIG. 5 illustrates the format of a cache request. The cache request comprise a 32-bit memory address. Bits 0 to 19 are sent to each chip set which comprise a BSM. The next five bits 20 to 24 constitute the BSM identification (ID); i.e., one of thirty-two for the example illustrated in FIG. 4. These are followed by bits 25 to 28 which identify a DW within the BSM; i.e., one of sixteen. The final three bits 29 to 31 of the address identify the byte within the DW. Cache requests are for sixteen contiguous DWs on sixteen DW boundaries, otherwise known as lines.

FIG. 6 shows the BSM design. Address and control information from the SCE 18 (FIG. 4) are stored in the input request queue 34 while data, in two DWs, is stored in the data buffers 36. The address and control information in the queue 34 is accessed by the address and control logic 38 which generates the required address and control and select signals to the memory array 40. For the example illustrated, it is assumed that the memory array 40 is composed of eight chip sets. The data in buffers 36 are accessed by the steering logic 42 which inputs data to the memory array 40. The address and control logic 38 also provides data out control signals to data out steering logic 44. The data out steering logic 44 includes buffers for storing data read out of the memory array 40 and outputs data on two DW buses $44_1$ and $44_2$.

FIG. 7 shows the data structure of a request from the request queue 34. The base address comprises bits $ADDR_0$ to $ADDR_{19}$. The DW address comprises bits $ADDR_{25}$ to $ADDR_{28}$. The stride value (SV) is a field of four bits; one bit is a sign bit and the other three bits designate a stride from one to eight. Finally, there are four control bits; a request valid bit, a fetch/store bit, a DW/QW bit, and a mode bit.

Figure 8:
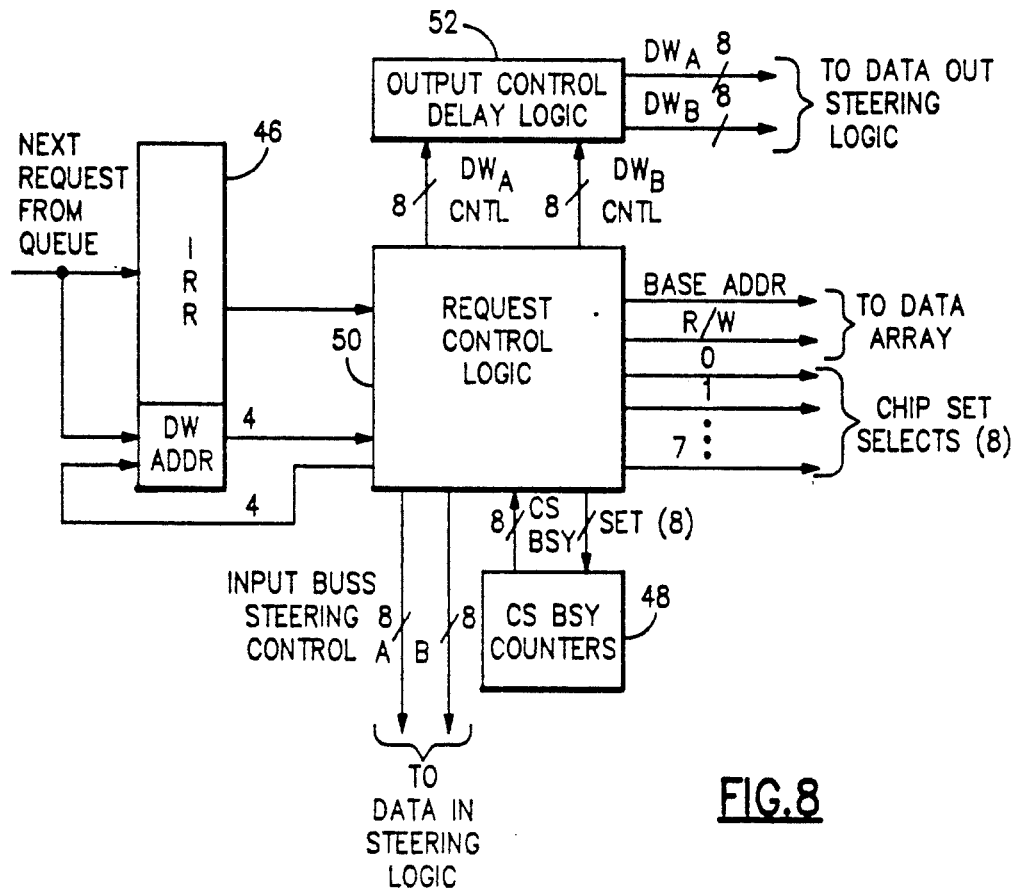
FIG. 8 is a block diagram showing the address and control logic of the BSM shown in FIG. 6.

The request from the request queue 34 is supplied to the address and control logic 38, which is shown in more detail in FIG. 8. An input request register (IRR) 46 holds the currently executing request with its fields as shown in FIG. 7. A set of eight chip set busy counters 48 keep track of which of the eight chip sets are available to accept a request. The request control logic 50 generates the chip set selects and chip set select sequences from the stride value (SV), mode type and the initial DW address in the IRR 46. The control logic 50 also generates control for both the input and output data steering logic 42 and 44 shown in FIG. 6. The control of the output data is delayed by a set of shift registers 52 to account for the chip set access time.

The chip set busy counters 48 are counters that count down from a preset value to zero. The preset value is the chip busy time which, in the example being described, is four cycles. On every cycle, all eight of the counters are decremented by one unless already at zero, in which case, they remain at zero indicating not busy for the corresponding chip set. When a request is made, the corresponding chip set busy counters are set to the preset value. This occurs on the cycle that the chip set is made busy. The chip set busy counters 48 and logic 50 thereby provide a means to determine if a chip set is busy from a previous request.

Figure 9:
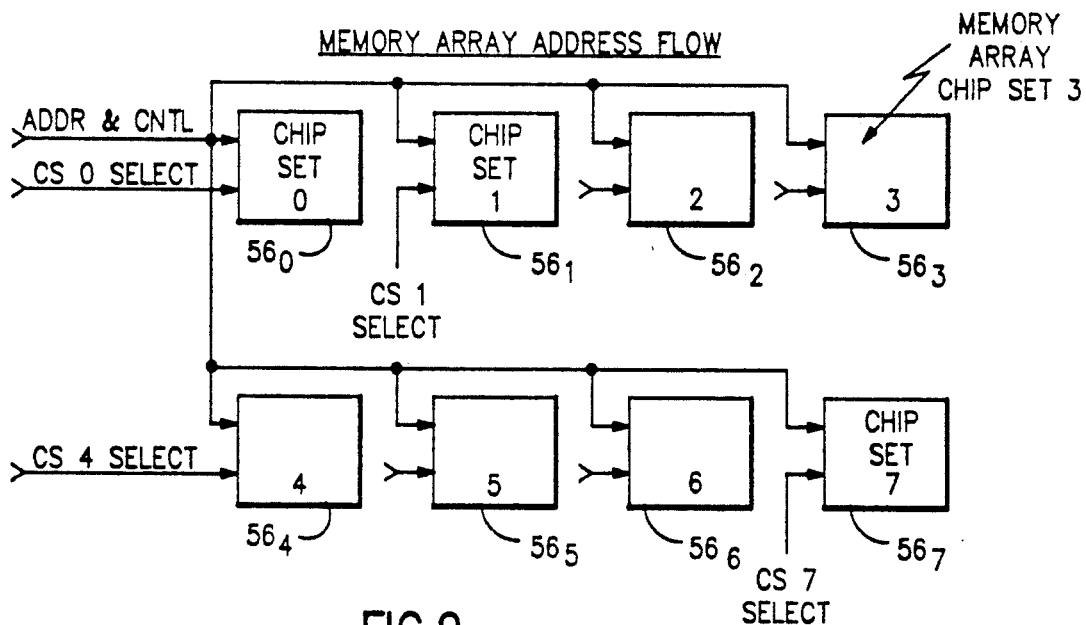
FIG. 9 is a block diagram illustrating memory address flow for the BSM shown in FIG. 6.

FIG. 9 illustrates the chip set that constitutes the memory array 40. In this example, there are eight chip sets $56_0$ to $56_7$. As shown in FIG. 10, each chip set comprises a DW interleave, such that $DW_0$ is contained in interleave zero, $DW_1$ is contained in interleave one, and so forth. The logic on the BSM allows the DW from an interleave to be placed on either DW bus. This feature enables strides up to a maximum of eight to have the same data rate as stride one operations. FIG. 11 is a block diagram showing the data flow for the BSM shown in FIG. 6 with the eight chip sets of FIG. 9 with the DW interleave shown in FIG. 10. The data-in steering logic 42 receives two DWs, denoted $DW_A$ and $DW_B$, and steers these DWs to corresponding chip sets. For example, if $DW_A$ and $DW_B$ are $DW_9$ and $DW_{10}$, then steering logic 42 steers these DWs to chip sets $56_2$ and $56_3$, respectively. Likewise, the data-out steering logic 44 receives DWs from each of the eight chip sets, selects two of these DWs and outputs them on two DW buses $44_1$ and $44_2$.

Figure 12:
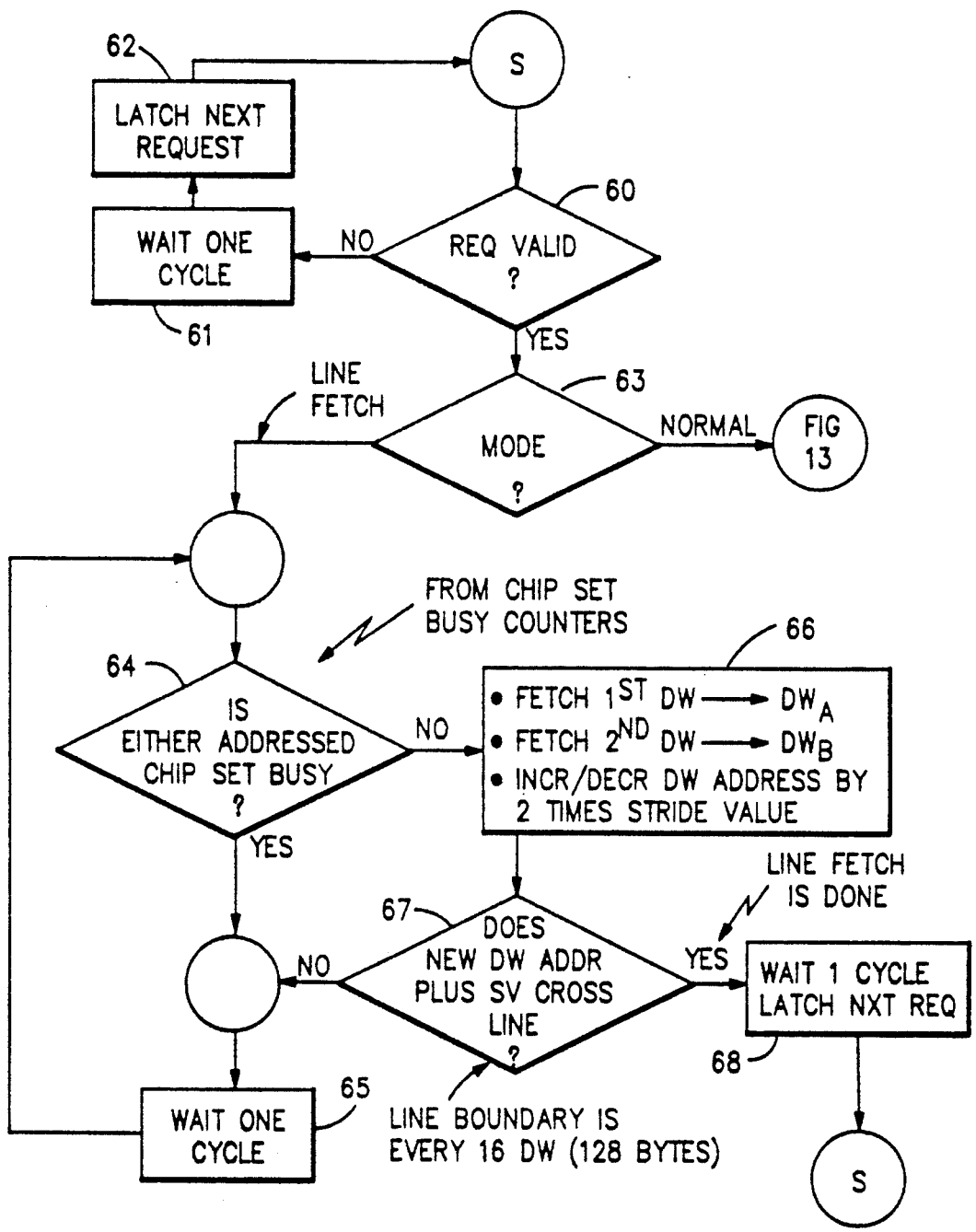
FIG. 12 is a flow diagram illustrating the logic of the "line fetch" mode of operation.

FIG. 12 shows the logic for the "line fetch" mode. Beginning with the starting point "S", the logic will wait until a valid request is placed in the IRR 46 (FIG. 8) by testing in decision block 60 the request valid bit (FIG. 7). If the request valid bit for a request is not set, the process waits one cycle in function block 61, and then latches the next request in function block 62. When the request valid bit is set, a further test of the mode bit (FIG. 7) is made in decision block 63 to determine the mode. If the request is for a "line fetch", then the first thing that is done is to check that the chip sets for the addressed DW and the next sequential DW (i.e., DW address plus SV) are not busy from a previous request. This is done in decision block 64 by checking the chip set busy counters (FIG. 8). If they are busy, then the logic waits one cycle, as indicated by function block 65, and makes the test in decision block 64 again.

When both interleaves are free, the two DWs are fetched by activating the corresponding chip selects. In function block 66, the DW address is then either incremented or decremented by two times the SV, depending on the sign of the stride value, and this result is placed in the DW address field of the IRR 46. A check is then made in decision block 67 to determine if the next request (if made) would cross into a new "line" address. In the example being described, a "line" is sixteen DWs on sixteen DW boundaries. If the next request would cross into a new line address, no new chip accesses are required to complete this line fetch, and the operation ends by waiting one cycle and latching the next request in function block 68 before returning to the starting point "S". Otherwise, the process goes to function block 65, and the new DW address is used to generate the next set of chip selects. This continues until all DWs within the addressed line are returned to the requester. Note that for negative strides, the data returns from the "top" of the line first.

Figure 13:
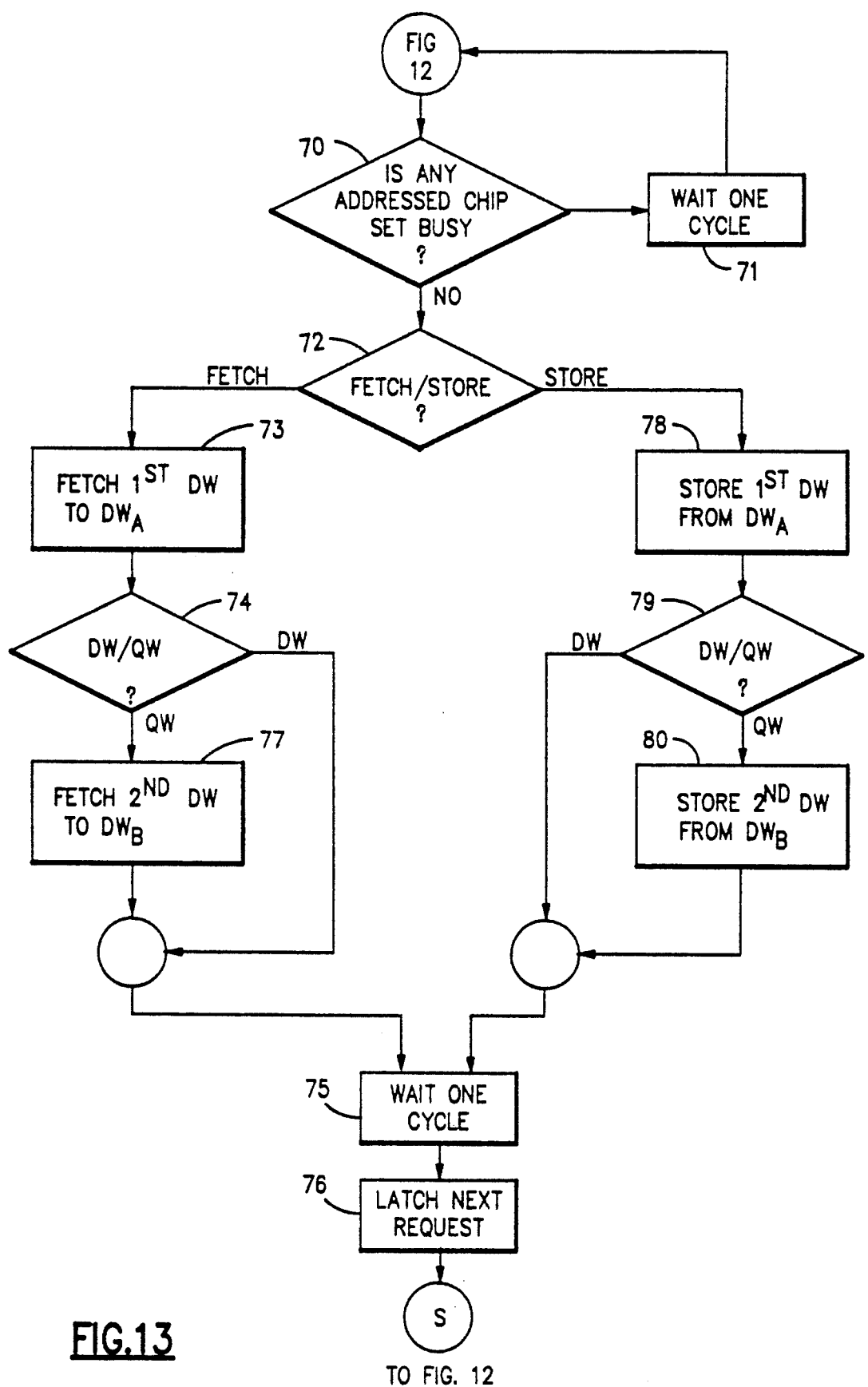
FIG. 13 is a flow diagram illustrating the logic of the "normal fetch" mode of operation.

Returning to decision block 63, if the mode is the "normal" mode, the process goes to FIG. 13, to which reference is now made. In the "normal" mode, the request will wait until any chip sets needed are not busy. Note that one chip set is accessed for a DW request and two for a QW request. This wait cycle is indicated by the loop of decision block 70 and function block 71. When the addressed chip set is available, a test is made in decision block 72 to determine if the request is a fetch or a store. The fetch logic is shown in the left side of FIG. 13, while the store logic is shown on the right side.

For the fetch operation, the first DW word is fetched in function block 73, and then a test is made in decision block 74 to determine if the request is for a DW or a QW. If for a DW, the process ends by going to function block 75 to wait one cycle and then to function block 76 to latch the next request before returning to the starting point "S" in FIG. 11. On a QW fetch, both the first DW (DW base address) and the second DW (DW address plus or minus SV) are accessed in function blocks 73 and 77 before the request ends.

The store operation is similar. The first DW is stored in function block 78, and then a test is made in decision block 79 to determine if the request is for a DW or a QW. If for a DW, the process ends by going to function block 75 to wait one cycle and then to function block 76 to latch the next request before returning to the starting point "S" in FIG. 12. On a QW fetch, both the first DW (DW base address) and the second DW (DW address plus or minus SV) are stored in function blocks 78 and 80 before the request ends.

In the line fetch mode, the BSM returns all DWs within the line contained on that BSM for the requested stride. Thus, the line fetch mode is used for scalar cache line fetches to get a full "line" and put that into the cache. This is equivalent to a vector stride one line fetch that gets all element in the line. In both cases, eight address cycles are used by the BSM to fetch the data. A vector line fetch for stride four gets every fourth DW in the line beginning with the DW requested. This "line fetch" requires only two address bus cycles and delivers only four DWs for the embodiment described. The data bus utilization, however, is still at the maximum possible (i.e., 100%).

In the normal mode, the BSM returns either one or two DWs, depending on stride value and type of request (i.e., DW or QW). The two DWs are separated by the stride value. All stores use this normal mode only. Again, either one or two DWs are stored depending on the type of request. Scalar stores are only of the DW type since all stores to memory from the store through cache are for one DW only.

Alternatively, a "line store" mode might be implemented where both scalar values and vectors store full lines in a manner similar to line fetches (and with strides up to half the line size). This mode of operation may be required if the cache design were "store in", that is, did only line stores, and/or it was advantageous for the vector unit to store more than two DWs in a single request.

Figure 14:
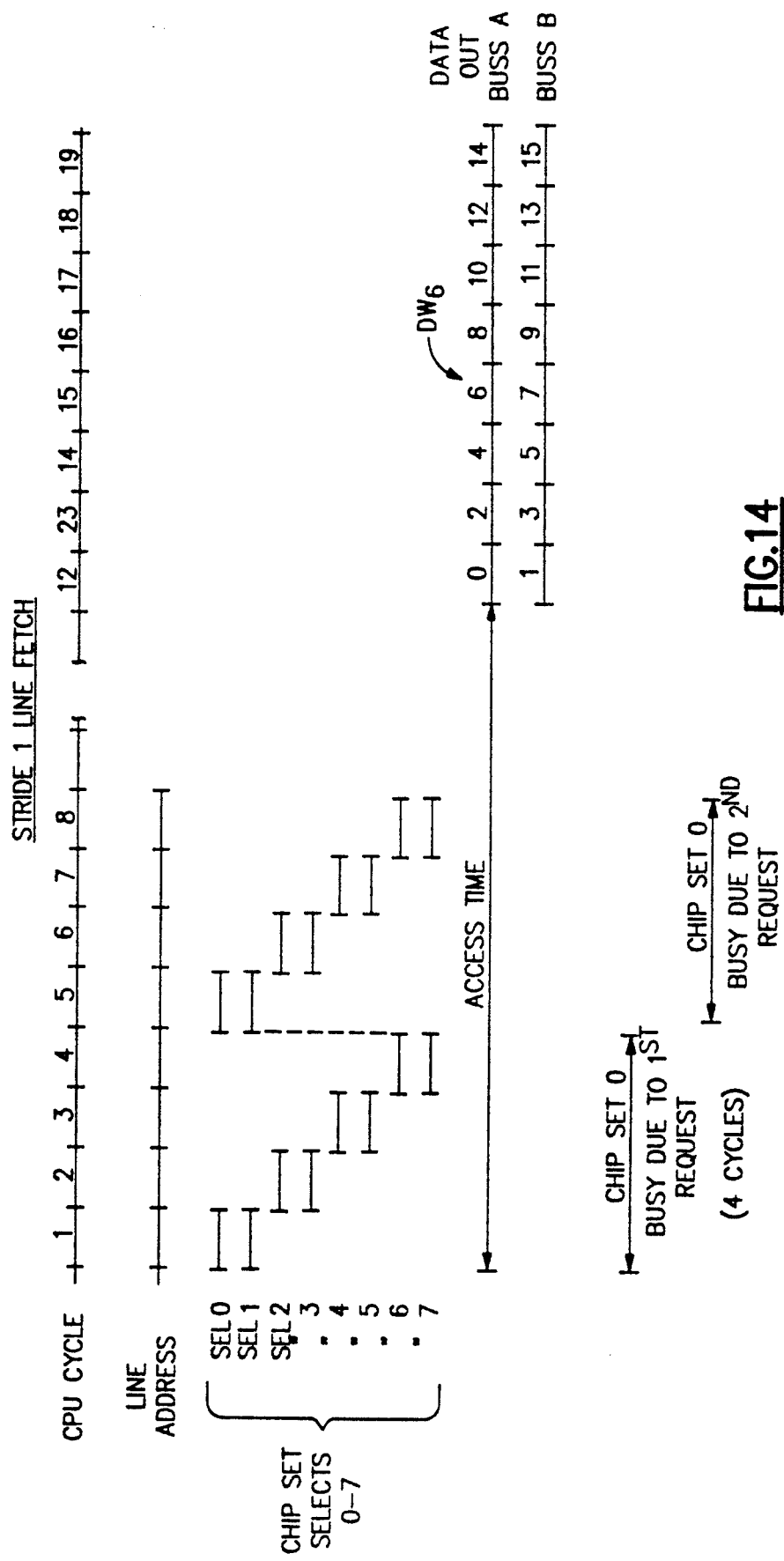
FIG. 14 is a timing diagram showing the operation of the BSM according to the invention for a stride one line fetch.
Figure 15:
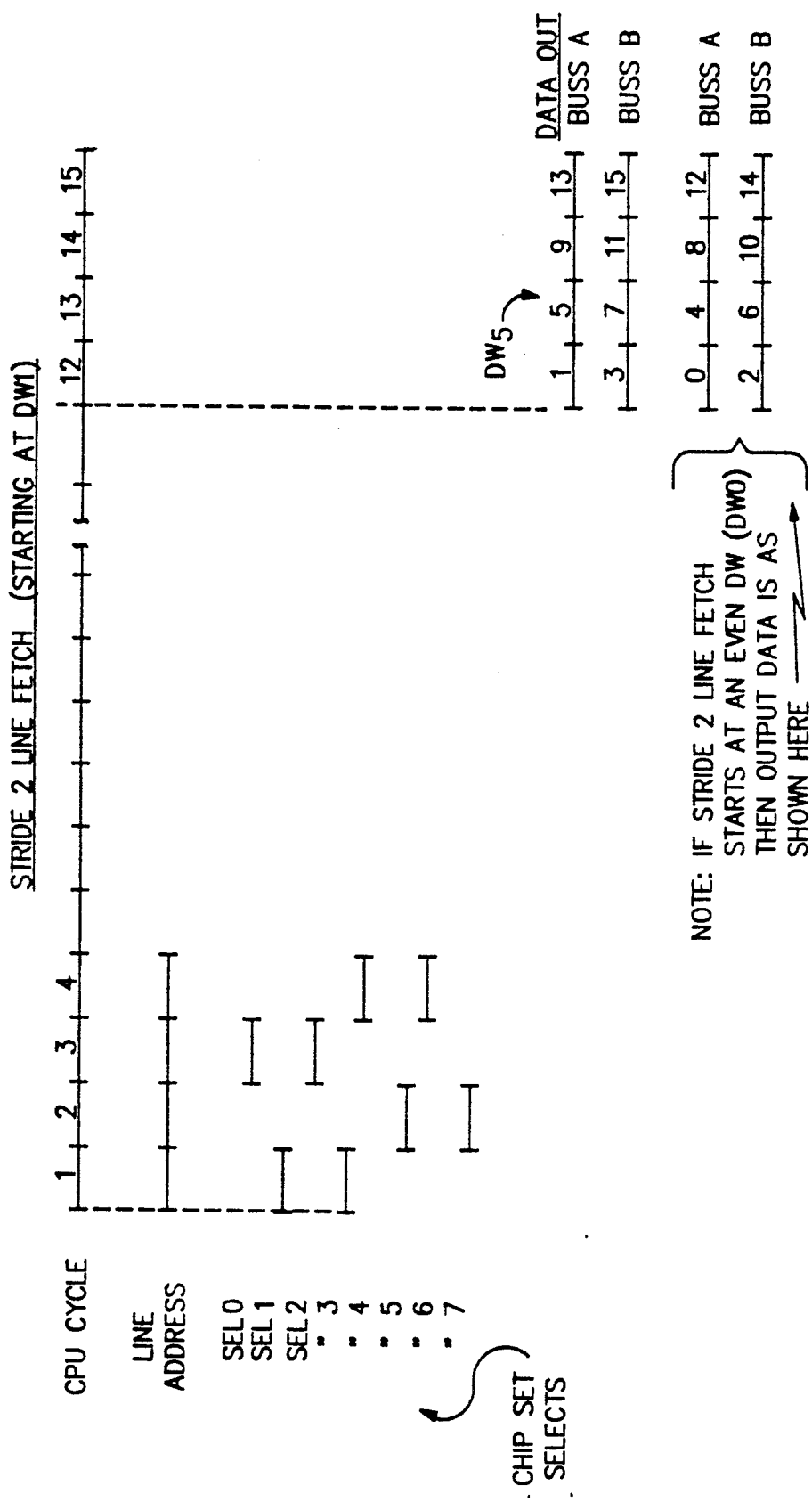
FIG. 15 is a timing diagram showing the operation of the BSM according to the invention for a stride two line fetch.

FIG. 14 is a timing diagram illustrating the operation of the BSM for stride one or scalar line fetch. Referring back to FIG. 10, a stride two line fetch would behave as follows: First, the storage address for the start of the line ($DW_0$) is presented to the BSM by the SCE. Second, the BSM then accesses in order interleave 0 and 2 (for $DW_0$ and $DW_2$), interleave 4 and 6 (for $DW_4$ and $DW_6$), interleave 1 and 3 (for $DW_8$ and $DW_{10}$), and interleave 5 and 7 (for $DW_{12}$ and $DW_{14}$). Note that the even/odd "switching" as defined above allowed the accessing of $DW_8$ and $DW_{10}$ only two cycles later than $DW_0$ and $DW_2$ since these DWs were on different interleaves (even with a chip "busy" time of four cycles). This stride two example is illustrated in the timing diagram of FIG. 15.

Figure 16:
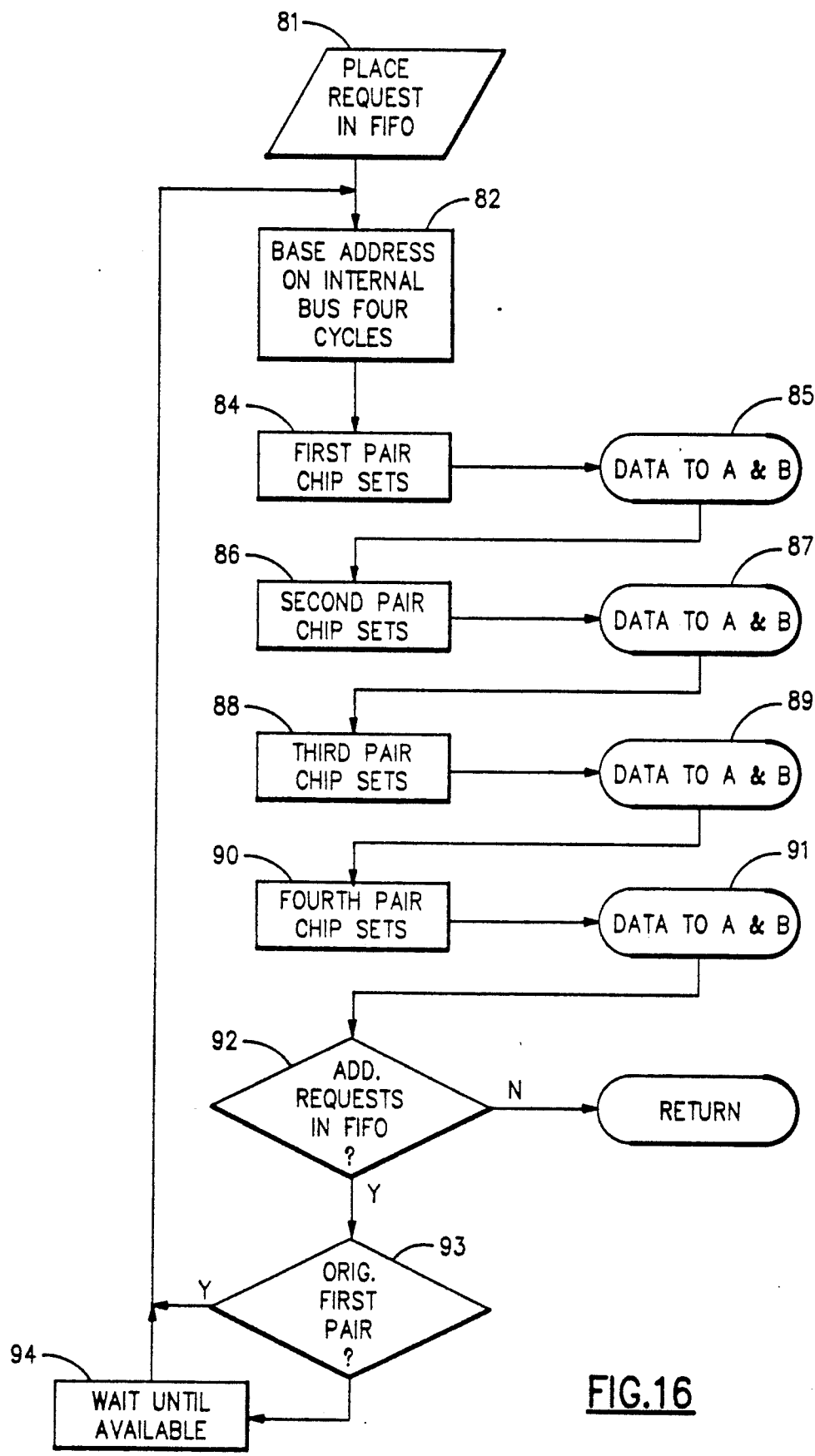
FIG. 16 is a flow diagram illustrating the sequence of operations on a stride two line fetch.

FIG. 16 is a flow diagram illustrating in more detail the sequence of operations in the stride two fetch example. For each cycle, a line fetch request is sent to the BSM and placed in a FIFO (first-in, first-out) queue, as indicated in function block 81. At cycle one, the request is at the top of this queue. In function block 82, the base address is placed on the internal address bus and remains on this bus for four cycles. Chip set select for the first pair of chip sets are activated in function block 84 to begin a fetch of DWs. For example, the first pair in this stride two example might be chip sets one and three; therefore, activating the chip set select for chip sets one and three allows fetching of DWs one and three (See FIG. 10). The DWs thus fetched are steered by steering logic 44 (FIG. 11) to DW output buses $44_1$ and $44_2$, as indicated in function block 85. Next, in function block 86, the chip set selects for the second pair of chip sets are activated. In this sequence, chip set selects for chip sets five and seven are activated to fetch DWs five and seven. The DWs fetched are output on DW output buses $44_1$ and $44_2$, as indicated in function block 87. This is followed in order in function blocks 88, 89 and 90, 91 by activating, in this sequence, chip set selects zero and two to fetch DWs nine and eleven and then activating chip set selects four and six to fetch DWs thirteen and fifteen.

A test is then made in decision block 92 to determine if there is a next request in the FIFO queue. If so, a test is made in decision block 93 to determine if the next request is to start at the original pair of chip sets, in this case chip sets one and three. If so, the process loops back to function block 82; otherwise, the process must wait one or more cycles until the chip sets become available (i.e., not busy), as indicated in function block 94. Note that the "busy" time for the example illustrated is four cycles, so that in the sequence of steps illustrated by function blocks 84, 86, 88, and 90, the chip sets one and three will be available after chip sets four and six have been accessed. The sequence is repeated for each request in FIFO as determined in decision block 92.

Figure 18:
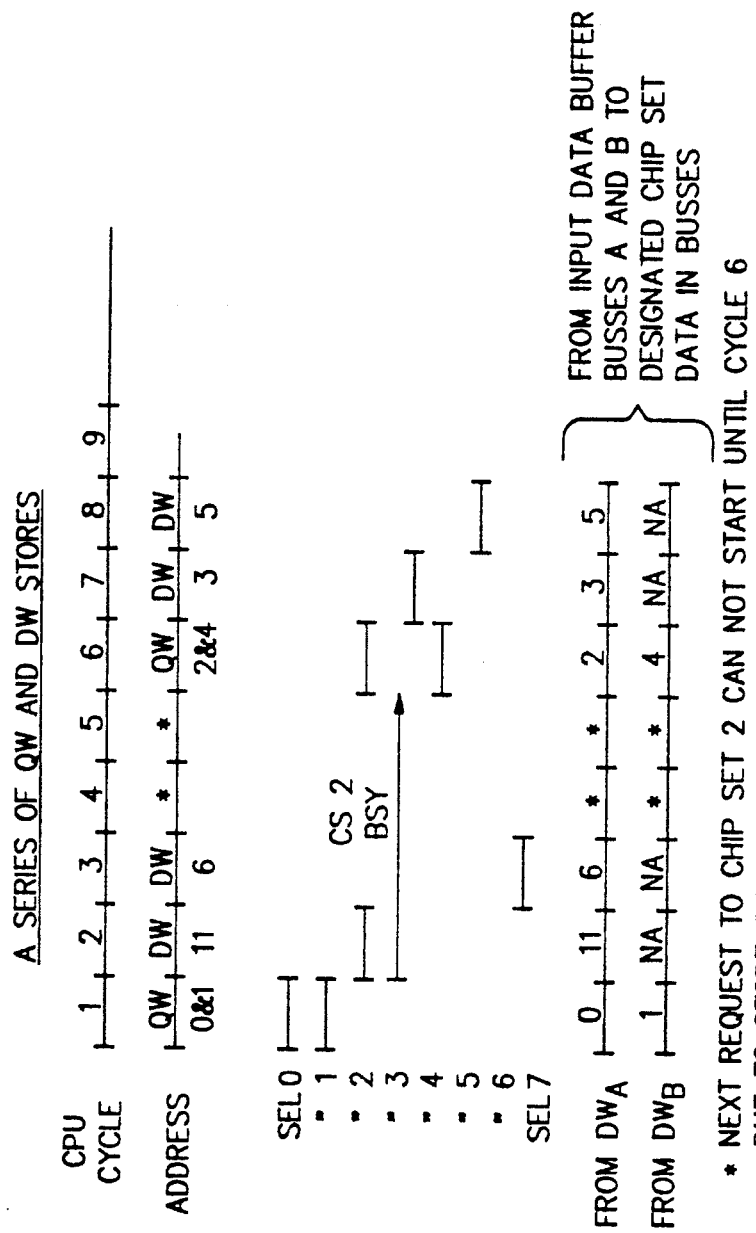
FIG. 18 is a timing diagram showing the operation of the BSM according to the invention for a series of QW and DW stores.

The sequence for stride values other than two is similar to that illustrated in FIG. 16. Timing diagrams for stride four line fetch and a series of QW and DW stores are shown in FIGS. 17 and 18, respectively. The following table summarizes the types of operations permitted with the invention. Note that negative stride values are also possible and allowed. The invention works in the same way for negative stride values as it does for positive stride values.

TABLE

| MODE | STRIDE | CYCLES | DWs | NOTES |
|---|---|---|---|---|
| LF | 1 | 8 | 16 | Cache LF |
| LF | 1 | 8 | 16 | Vector LF |
| LF | 2 | 4 | 8 | Vector LF |
| LF | 4 | 2 | 4 | Vector LF |
| LF | 8 | 1 | 2 | Vector LF |
| Normal QW | 1 to 8 | 1 | 2 | Vector (fetch or store) |
| Normal DW | NA | 1 | 1 | Vector (fetch or store) |
| Normal DW | NA | 1 | 1 | Scalar DW store |

LF means line fetch, NA means not applicable. Note that both a normal mode QW fetch with stride 8 and line fetch mode with stride 8 produce the same operation. The other strides (3, 5, 6, and 7) are not shown for simplicity.

The BSM according to the invention has two fetch modes of operation; the normal QW fetch mode as in the conventional design (for strides greater than the "line" size) and the line fetch mode where all DWs within the referenced line are returned to the SCE at two DWs per cycle for strides one through eight (twice the conventional bandwidth) or at least one DW per cycle for all other strides (equal to conventional) with the exception of some odd stride requests which reference the same interleave. Stride N stores can also be accommodated at two DWs per cycle for stride one through stride eight, again at twice the bandwidth of the conventional method and at least one DW per cycle for all other strides.

The line fetch mechanism also has other advantages over the QW per BSM fetch method. Only one queued request is required for every line (up to sixteen DWs) of data allowing for reduced SCE queue delays per QW (except for strides greater than the line size). Note that the statistical majority of operations are for stride one and stride two data. Scalar fetch requests are for cache $L_1$ lines which are also sixteen DW lines. In the usual or conventional method, eight separate BSM requests are required to complete line fetch. In this design, only one request is required.

The idea of defining a "pattern" for the placement of data within a BSM "line" can be generalized for many line sizes, various interleaves per BSM, etc. The optimal BSM line size and the optimal pattern is a function of performance analysis and stride content. The exemplified line size (sixteen DWs), "pattern" ($DW_0$ with $DW_9$, etc.) number of interleaves per BSM (e.g., eight) may not be optimal for all requirements, and each need must be organized to meet the requirements, best pattern, and so forth for optimal performance.

While the invention has been described in terms of a single preferred embodiment, those skilled in the art will recognize that the invention can be practiced with modification within the spirit and scope of the appended claims. For example, a DW as used in the illustrated example comprises sixty-four bits, but more generally, a DW should be understood to mean a data element of any length. Similarly, a "line" in the illustrated example is sixteen contiguous DWs that are on sixteen DW memory boundaries; however, this could have been, for example, eight or thirty-two elements (i.e., $2^N$ elements).

Having thus described our invention, what we claim as new and desire to secure by Letters Patent is as follows:

1. A memory system for a data processing system having a line fetch mode of operation and a normal mode of operation, said memory system comprising:
an array of storage element units for storing a plurality of data elements in a predetermined pattern;
first, second, third, and fourth data element buses connected to said array of storage element units, each of said first and second buses for use in storing such data elements in the storage element units and each of said third and fourth buses for use in reading out such data elements stored in the storage element units;
means for storing a base storage element unit address and a stride value for a request, and data identifying the request as one of said line fetch and normal modes of operation; and
controller means responsive to said data identifying the request as one of said line fetch and normal modes of operation and said stride value for controlling said array in said line fetch mode of operation to read out data elements at storage element unit addresses separated by said stride value using said third and fourth data element buses and for controlling said array in said normal mode for reading out data elements using said third and fourth data element buses and storing data elements using said first and second data element buses.

2. The memory system recited in claim 1 wherein said means for storing further stores data identifying whether such data elements are to be fetched or stored in said normal mode, said controller means determining whether an addressed storage element in said array at said base address is available and, if available, determining whether the request is a fetch or store request, fetching a corresponding data element at said base address when the request is such a fetch request, and storing a data element at said base address when the request is such a store request.

3. The memory system recited in claim 2 wherein said means for storing further stores data identifying whether the request is for a single or double data element, said controller means fetching a next contiguous data element to said corresponding data element when the request is such a fetch request, and storing a data element at a next contiguous address to said base address when the request is such a store request.

4. The memory system recited in claim 1 further comprising:
data in steering logic means interposed between said first and second buses and said array; and data out steering logic means interposed beween said array and said third and fourth buses, said data in and data out steering logic means each respectively controlled by said controller means for steering element in storage data element units into or out of said array; and delay means for delaying control signals from said controller means to said data out steering logic.

5. A method of operating a memory system for a data processing system in a line fetch mode of operation and a normal mode of operation, said memory system including an array of storage element units for storing a plurality of data elements in a predetermined pattern and first and second data element buses connected to said array of storage element units, each of said buses including means for reading out such data elements in storage element units, said method comprising the steps of:

storing a storage element unit base address and a stride value for a request and data identifying the request as one of said line fetch mode and said normal mode of operation;

if the request is for such a line fetch mode of operation, determining whether storage elements in said array at said base address and said base address plus said stride value are available and, if so, fetching corresponding data elements and selecting a next base address;

testing said next base address to determine if said next base address plus the stride value cross a boundary defined by a predetermined number of data elements and, if not, continuing to fetch data elements separated by said stride value until said boundary is crossed.

6. The method of operating said memory system recited in claim 5 wherein line fetch mode requests are performed as multi-cycle data bus operations fetching all such data elements within a predetermined boundary.

7. The method of operating said memory system receited in claim 5 wherein said normal mode of operation is identified, further comprising the steps of:

storing data identifying a request as a fetch or a store request;

determining whether an addressed storage element in said array at said base address is available and, if available, determining whether the request is a fetch or store request;

fetching a corresponding data element at said base address for a fetch request; and storing a data element at said base address for a store request.

8. The method of operating said memory system receited in claim 7 further comprising the steps of:

storing data identifying whether the request is for a single or double data element;

fetching a next contiguous data element to said corresponding data element when the request is a fetch request; and storing a data element at a next contiguous address to the first mentioned base address for when the request is a store request.

9. The method of operating said memory system recited in claim 8 wherein in normal operation, fetches and stores are made in a single data bus cycle of one data element per request for a vector stride N, where N is greater than a preselected number.

* * * * *